(12) United States Patent
Matsugu et al.

(10) Patent No.: US 7,881,524 B2
(45) Date of Patent: Feb. 1, 2011

(54) INFORMATION PROCESSING APPARATUS AND INFORMATION PROCESSING METHOD

(75) Inventors: Masakazu Matsugu, Yokohama (JP); Katsuhiko Mori, Kawasaki (JP); Masami Kato, Sagamihara (JP); Hiroshi Sato, Kawasaki (JP); Yuji Kaneda, Kawasaki (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 11/396,701

(22) Filed: Apr. 4, 2006

(65) Prior Publication Data

US 2006/0228005 A1 Oct. 12, 2006

(30) Foreign Application Priority Data

Apr. 8, 2005 (JP) ............................. 2005-112663

(51) Int. Cl.
*G06K 9/62* (2006.01)
(52) U.S. Cl. .................... 382/156; 382/115; 706/20
(58) Field of Classification Search ................ 382/115, 382/156; 706/20
See application file for complete search history.

(56) References Cited

U.S. PATENT DOCUMENTS

| | | | | | |
|---|---|---|---|---|---|
| 5,258,836 | A | * | 11/1993 | Murata ..................... | 348/415.1 |
| 5,487,133 | A | * | 1/1996 | Park et al. ..................... | 706/20 |
| 5,555,512 | A | * | 9/1996 | Imai et al. ..................... | 702/127 |
| 5,586,215 | A | * | 12/1996 | Stork et al. ................. | 704/232 |
| 5,918,222 | A | * | 6/1999 | Fukui et al. ..................... | 707/1 |
| 6,185,316 | B1 | * | 2/2001 | Buffam ....................... | 382/115 |
| 6,463,176 | B1 | | 10/2002 | Matsugu et al. .............. | 382/195 |
| 6,907,140 | B2 | | 6/2005 | Matsugu et al. .............. | 382/195 |
| 7,039,233 | B2 | | 5/2006 | Mori et al. ................... | 382/181 |
| 7,054,850 | B2 | | 5/2006 | Matsugu ....................... | 706/48 |
| 7,059,531 | B2 | * | 6/2006 | Beenau et al. .............. | 235/487 |
| 2002/0181775 | A1 | | 12/2002 | Matsugu ....................... | 382/195 |
| 2003/0044073 | A1 | | 3/2003 | Matsugu et al. ............. | 382/195 |
| 2006/0074653 | A1 | | 4/2006 | Mitari et al. ................. | 704/240 |
| 2006/0115157 | A1 | | 6/2006 | Mori et al. ................... | 382/190 |
| 2006/0204053 | A1 | | 9/2006 | Mori et al. ................... | 382/118 |
| 2006/0228005 | A1 | | 10/2006 | Matsugu et al. ............. | 382/116 |

FOREIGN PATENT DOCUMENTS

| JP | 5-89076 | 4/1993 |
|---|---|---|
| JP | 5-108596 | 4/1993 |

(Continued)

OTHER PUBLICATIONS

U.S. Appl. No. 11/630,031 (Suzuki et al.), filed Dec. 19, 2006.

(Continued)

*Primary Examiner*—Bhavesh M Mehta
*Assistant Examiner*—Dennis Rosario
(74) *Attorney, Agent, or Firm*—Fitzpatrick, Cella, Harper & Scinto (57) ABSTRACT

A plurality of kinds of feature amounts are collected from image information and voice information on a person existing in a space, valid values of the collected feature amounts are calculated, feature amounts to be used for personal recognition are determined in the collected feature amounts on the basis of the calculated valid values, and personal recognition is performed by using the determined feature amounts.

13 Claims, 9 Drawing Sheets

FOREIGN PATENT DOCUMENTS

| | | |
|---|---|---|
| JP | 7-302351 | 11/1995 |
| JP | 9-131335 | 5/1997 |
| JP | 11-13164 | 1/1999 |
| JP | 11-73196 | 3/1999 |
| JP | 11-96363 | 4/1999 |
| JP | 11-161791 | 6/1999 |
| JP | 11-253426 | 9/1999 |
| JP | 2000-102524 | 4/2000 |
| JP | 2000-148985 | 5/2000 |
| JP | 3078166 | 6/2000 |
| JP | 2000-242786 | 9/2000 |
| JP | 2001-109855 | 4/2001 |
| JP | 2001-184507 | 7/2001 |
| JP | 2001-331801 | 11/2001 |
| JP | 2001-338295 | 12/2001 |
| JP | 2002-008032 | 1/2002 |
| JP | 2002-008042 | 1/2002 |
| JP | 2002-344946 | 11/2002 |
| JP | 2002-358500 | 12/2002 |
| JP | 2003-141516 | 5/2003 |
| JP | 2003-186847 | 7/2003 |

OTHER PUBLICATIONS

LeCun et al., "Convolutional Networks for Images, Speech, and Time Series", Handbook of Brain Theory and Neural Networks, (M. Arbib, Ed.) MIT Press, pp. 255-258.

* cited by examiner

INFORMATION PROCESSING APPARATUS AND INFORMATION PROCESSING METHOD

FIELD OF THE INVENTION

The present invention relates to a personal recognition technique.

BACKGROUND OF THE INVENTION

Biometrics is known as a technique for authentication by verifying an individual's identity. As biometric verification or recognition, fingerprint verification (see Japanese Patent Laid-Open No. 11-96363), iris recognition (see Japanese Patent Laid-Open No. 2003-14156), voice verification (see Japanese Patent Laid-Open No. 11-73196), face verification (see Japanese Patent Laid-Open No. 11-161791) and the like are being used.

A method of performing authentication by checking a plurality of features for verification to improve the authentication accuracy is known (see Japanese Patent Laid-Open Nos. 2001-331801 and 2003-186847).

For example, an individual identification apparatus disclosed in Japanese Patent Laid-Open No. 2000-102524 uses both face image recognition and iris recognition.

A method, apparatus and recording medium disclosed in Japanese Patent Laid-Open No. 11-253426 are used to perform authentication by means of a plurality of bionic features in accordance with rules of discrimination in a feature space obtained by combining the verification scores of the bionic features.

A personal authentication system is disclosed in Japanese Patent Laid-Open No. 2000-242786 as an arrangement for probabilistically performing authentication by using a combination of two or more of fingerprint verification, face verification, voice verification and handwriting verification.

An individual authentication apparatus disclosed in Japanese Patent Laid-Open No. 2001-109855 uses a method of performing primary authentication processing by different authentication methods and making a final determination by uniting the results of primary authentication processing.

In an individual authentication system disclosed in Japanese Patent Laid-Open No. 2000-148985, voice, part or the whole of a face image and body smell are used as living body information and determination for authentication is made by using the degree of similarity (or a feature amount) of the first living body information and the degree of similarity of the second living body information.

In a personal authentication system using bionic information as disclosed in Japanese Patent Laid-Open No. 2001-338295, evaluations for authentication are made, for example, by evaluating the matching rate by means of voice information when a plurality of registered persons to be verified whose face information matching rate is equal to or higher than a threshold value exist, or by performing threshold value processing including multiplying together the face information matching rate and the voice information matching rate.

The above-described techniques using a plurality of features for verification lack consideration of the quality of feature detection signals used for verification and therefore entail a substantial problem that, for example, in a case where feature measurement conditions are not good and the SN ratio is considerably low, the error occurrence rate is increased relative to that in the case of collation using only good-quality feature detection signals.

For example, a person looks variously depending on the angle at which he/she is viewed, the distance through which he/she is viewed, his/her physical condition, an illumination condition, etc. In many cases of personal recognition where there is a need to recognize any person even under an unfavorable image taking condition, the recognition accuracy cannot be increased even if recognitions are made by integrally combining living body information items including face information or by using a predetermined method so that objects to be recognized are narrowed down.

Conventionally, there is a need to set a situation in which a subject is positioned just in front of a camera or made to utter a voice according to a voice instruction for authentication. The subject is thereby made conscious of being subjected to authentication. For this reason, personal recognition (authentication) cannot be performed on a subject of authentication with high accuracy while keeping the subject in a natural state without placing any burden on the subject.

SUMMARY OF THE INVENTION

In view of the above-described problems, an object of the present invention is to provide a personal recognition technique of evaluating the validity or the like of a feature detection signal obtained from a person who is a subject of authentication, and selecting suitable features such that the desired robustness against variations in illumination and environmental conditions and high collation accuracy are maintained.

Another object of the present invention is to provide a recognition technique of efficiently narrowing down subjects of recognition on the basis of this validity.

Still another object of the present invention is to provide a technique of using features relating to actions of a person, such as a person's manner of walking, mannerism, gesture, hawking and sneezing as auxiliary information for narrowing down subjects of recognition to reduce the time required for authentication as well as to improve the recognition accuracy.

A further object of the present invention is to provide a personal recognition technique of accurately recognizing a person while keeping the person in a natural state and unconscious of being subjected to authentication.

In order to achieve an object of the present invention, for example, an information processing apparatus of the present invention comprises the following arrangement.

That is, an information processing apparatus, the apparatus comprising:

acquisition means for obtaining environmental information on a space in which a person exists;

collection means for collecting a plurality of kinds of feature amounts from the environmental information obtained by the acquisition means;

calculation means for calculating valid values of the feature amounts collected by the collection means;

determination means for determining at least one of the feature amounts to be used for personal recognition among the plurality of kinds of feature amounts, on the basis of the valid values calculated by the calculation means; and recognition means for performing personal recognition by using the feature amounts determined by the determination means.

In order to achieve an object of the present invention, for example, an information processing method of the present invention comprises the following arrangement.

That is, an information processing method, the method comprising:

an acquisition step of obtaining environmental information on a space in which a person exists;

a collection step of collecting a plurality of kinds of feature amounts from the environmental information obtained in the acquisition step;

a calculation step of calculating valid values of the feature amounts collected in the collection step;

a determination step of determining at least one of the feature amounts to be used for personal recognition among the plurality of kinds of feature amounts, on the basis of the valid values calculated in the calculation step; and a recognition step of performing personal recognition by using the feature amounts determined in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 2:
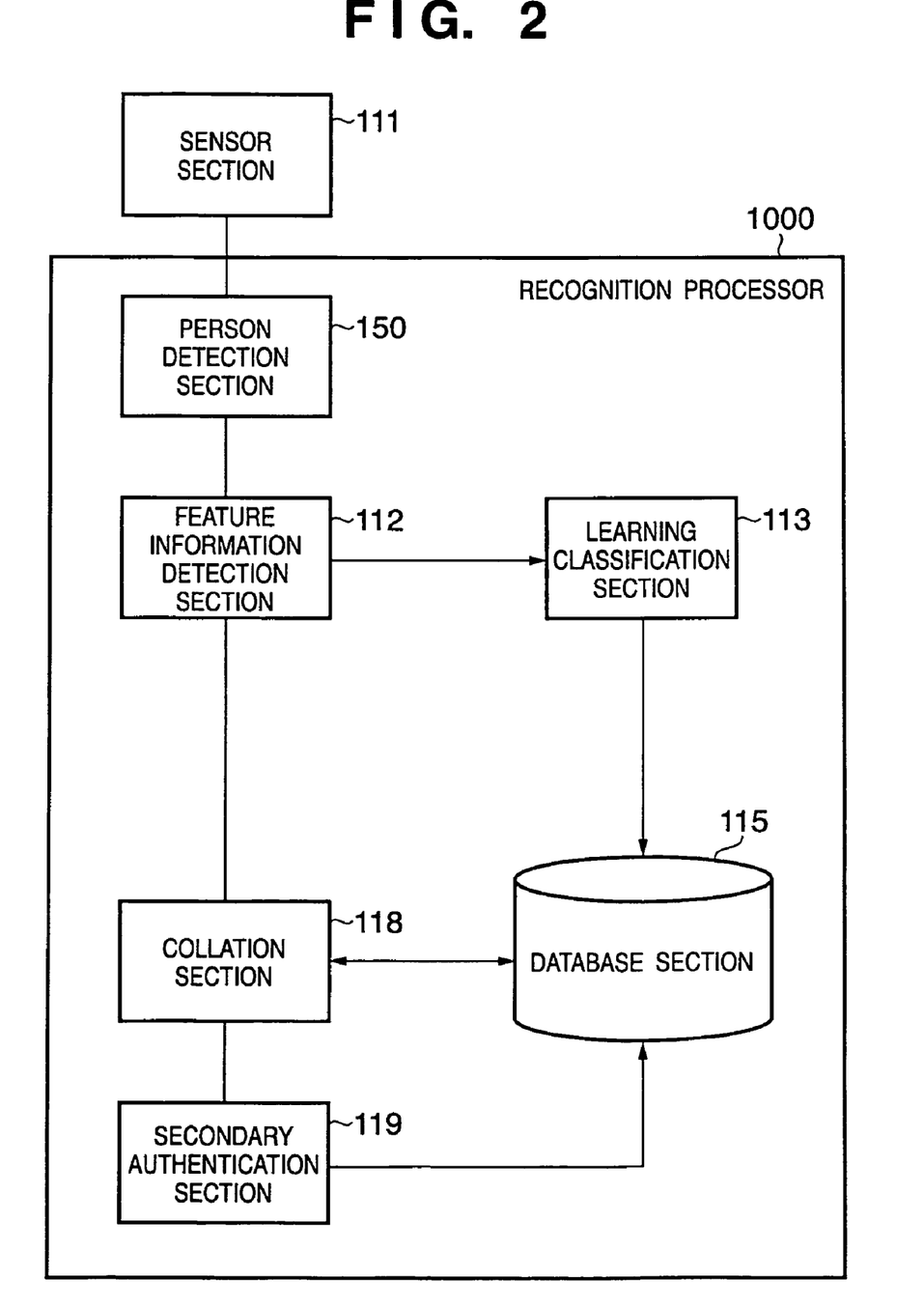
FIG. 2 is a block diagram showing a functional configuration of a personal recognition system according to a first embodiment of the present invention.

FIG. 2 is a block diagram showing the functional configuration of a personal recognition system according to a first embodiment of the present invention. The system obtains an image and a voice from a person and recognizes the person on the basis of the obtained image and voice. The system shown in FIG. 2 is constituted by a sensor section 111 and a recognition processor 1000. The recognition processor 1000 is constituted by a person detection section 150, a feature information detection section 112, a learning classification section 113, a database section 115, a collation section 118 and a secondary authentication section 119.

Figure 9:
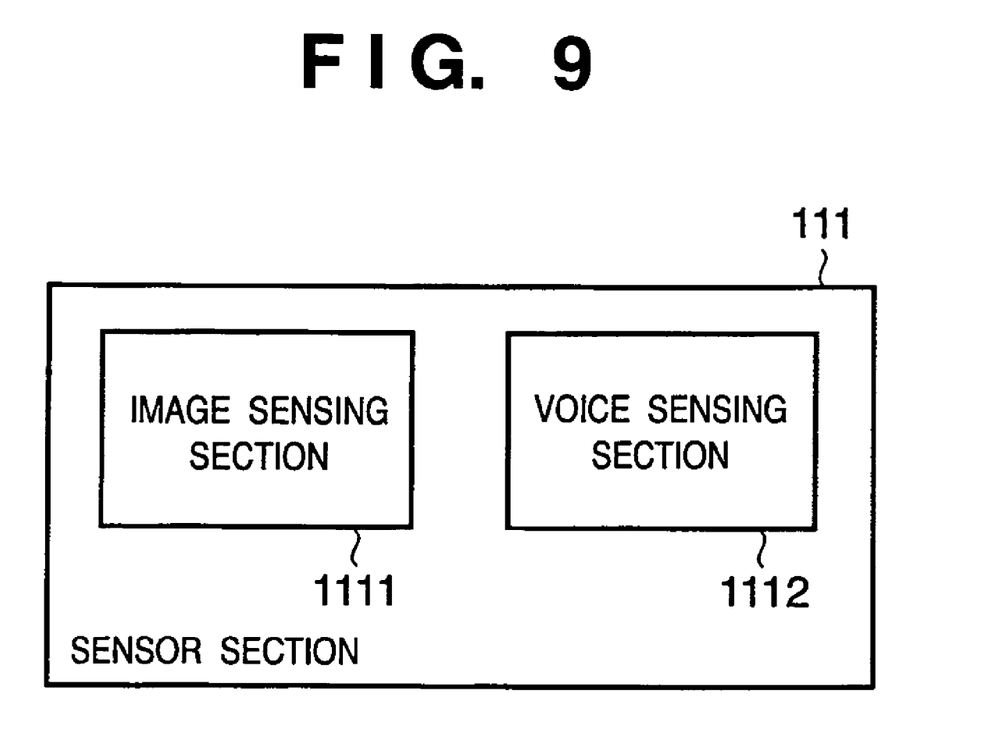
FIG. 9 is a block diagram showing a functional configuration of a sensor section 111 according to the first embodiment of the present invention.

The sensor section 111 collects image information and voice information in an actual space. More specifically, the sensor section 111 is constituted by a video camera for taking images (moving image/still image) in an actual space and a microphone for collecting voices in an actual space. In this embodiment, in order to collect image information and voice as environmental information in an actual space, the sensor section 111 is constituted by an image sensing section 1111 for collecting image information in an actual space and a voice sensing section 1112 for collecting voice information in an actual space, as shown in FIG. 9, which is a block diagram showing the functional configuration of the sensor section 111 according to this embodiment.

Sections for collecting image information and voice information in an actual space different from those described above may alternatively be used. For example, image information and voice information in an actual space held in an external unit may be collected.

Figure 7:
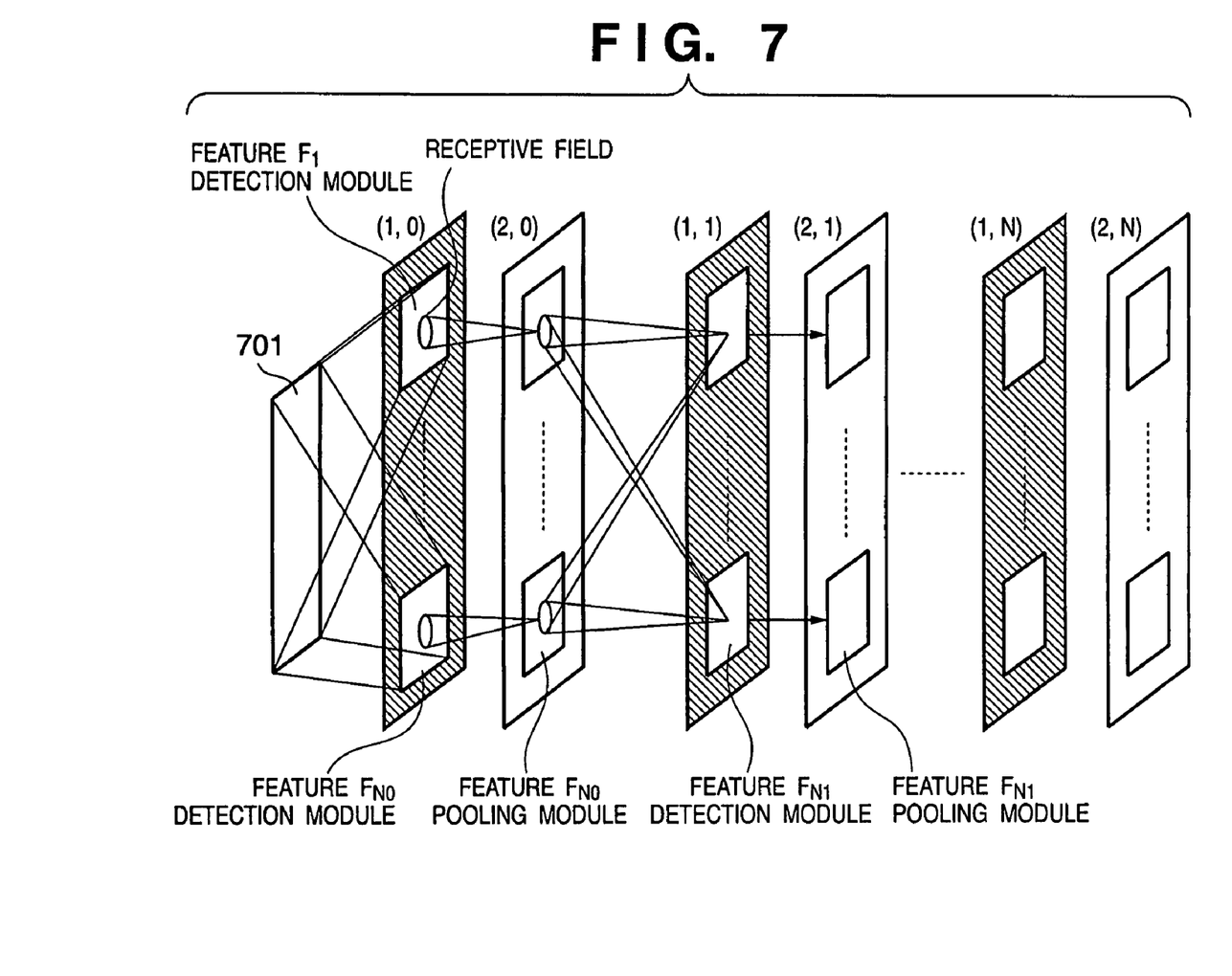
FIG. 7 is a diagram showing a functional configuration of a person detection section 150.

Referring again to FIG. 2, the person detection section 150 performs processing for determining a person image region from an image obtained by the sensor section 111. FIG. 7 is a diagram showing the functional configuration of the person detection section 150. As shown in FIG. 7, the person detection section 150 is constituted by a hierarchical neural network (a convolutional network structure which is one of hierarchical neural network models (c.f. LeCun, Y. and Bengio, Y., 1995, "Convolutional Networks for Images Speech, and Time Series" in Handbook of Brain Theory and Neural Networks (M. Arbib, Ed.), MIT Press, pp. 255-258)).

An image obtained by the sensor section 111 is input to a data input layer 701. A jth feature detection layer (1, j) is constituted by neuron elements (having a common local receptive field structure determined according to the kind of a feature amount to be detected) for detecting (one or more) local features in an input pattern from the preceding-stage layer at a predetermined resolution.

A kth feature integration (feature pooling) layer (2, k) is constituted by neuron elements having a predetermined receptive field structure ("receptive field" in the following denotes the range of coupling with an output element in the preceding layer, and "receptive field structure" in the following denotes the distribution of coupling loads). In the feature integration layer, computations for sub-sampling by local averaging or maximum output extraction for example are performed as processing for integrating the plurality of neuron outputs from the feature detection layer (in the local receptive fields of the feature integration layer neurons). The receptive fields of the neurons in the feature integration layer also have a common structure in modules corresponding to detected feature classes. For more details, see Japanese Patent Laid-Open Nos. 2002-8032 and 2002-358500 for example. Information on the detected position of the person in the image is output from the final output layer.

Figure 3:
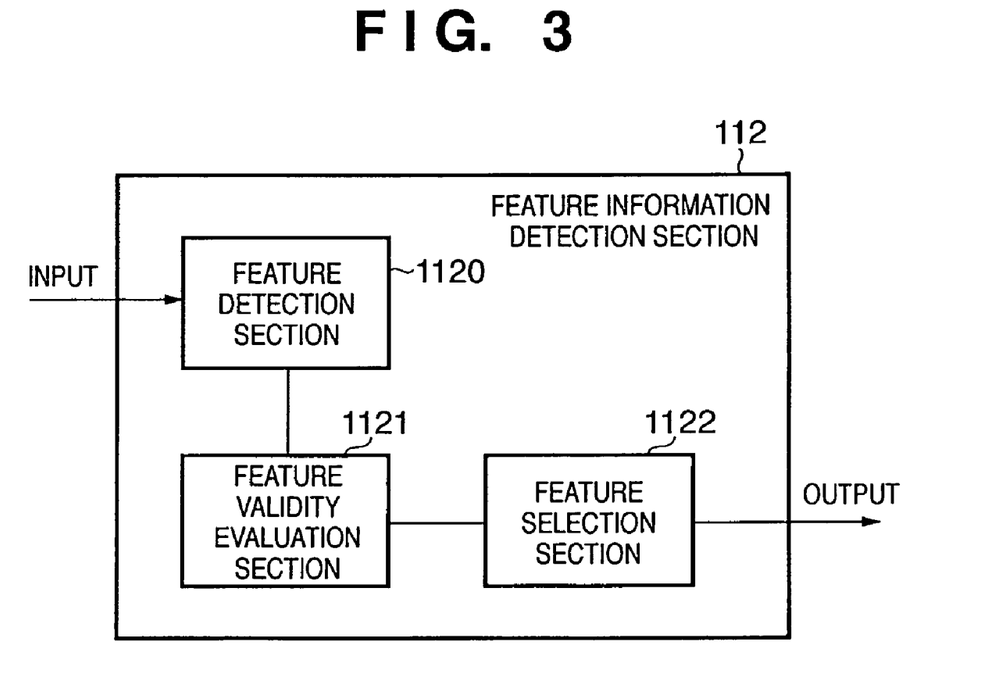
FIG. 3 is a block diagram showing a functional configuration of a feature information detection section 112.

The feature information detection section 112 performs processing for obtaining a feature amount in a class suitable for personal recognition on a person image at a position determined by the person detection section 150 and a feature amount in a class suitable for personal recognition from voice information obtained from the voice sensing section 1112. The feature information detection section 112 is constituted by a feature detection section 1120, a feature validity evaluation section 1121 and a feature selection section 1122, as shown in FIG. 3, which is a block diagram showing the functional configuration of the feature information detection section 112.

The feature detection section 1120 detects various feature amounts relating to a person image at a position determined by the person detection section 150 and various feature amounts for personal recognition from voice information obtained by the voice sensing section 1112.

The feature validity evaluation section 1121 obtains valid values with respect to feature amounts obtained by the feature detection section 1120.

The feature selection section 1122 determines feature amounts for personal recognition on a person at a position determined by the person detection section 150 (a person included in voice information obtained from the voice sensing section 1112) on the basis of the valid values of feature amounts obtained by the feature validity evaluation section 1121.

The collation section 118 collates feature amounts obtained by the feature information detection section 112 (feature amounts determined by the feature selection section 1122) and feature amounts registered with respect to individuals in the database section 115 with each other for personal recognition. Needless to say, if no match occurs between the feature amounts obtained by the feature information detection section 112 (feature amounts determined by the feature selection section 1122) and the feature amounts registered with respect to individuals in the database section 115, the collation section 118 determines that "the person image at the position determined by the person detection section 150 is not registered in the database 115". In this case, the learning classification section 113 registers the feature amounts obtained by the feature information detection section 112 in the database section 115, makes the feature information detection section 112 learn the person image at the position determined by the person detection section 150 by using the feature amounts, and registers the learning results in the database section 115, thereby enabling recognition of the person next time the feature amounts are presented to the collation section 118.

In the database section 115, feature amounts are registered on a class-by-class basis with respect to individuals. Classes in which the feature amounts are registered in the database section 115 with respect to individuals include persons' face images viewed at a plurality of angles or three-dimensional shape models for faces and face images viewed at discrete angles, image features relating to persons' dresses, articles in the possession of persons and hairstyles, and image features relating to gestures and manners of walking, and voice features relating to utterances, laughs and sneezes.

Classes used in this embodiment are, for example, still-image-based image features with respect to classes, such as the local configurations, contours, color component features and texture feature amounts of human body constituent parts, e.g., the eyes and mouth and information on the placement of the human body constituent parts e.g., the eyes and mouth in relation to faces, hairstyles, appearances from the back, figures, postures, dresses and personal belongings for example, moving-image-based image features, such as information on loci in a time-space domain of human body constituent parts with respect to gestures and manners of walking for example, and voice features, such as nonlinguistic voices, e.g., hawks and sneezes, and voice patterns relating to voices at the time of utterance. For personal discrimination using voice patterns, a technique described in Japanese Patent Laid-Open No. 7-302351 with respect to the patent application filed by the applicant of the present invention may be used.

The collation section 118 also performs processing for collation of image information with the database section 115 and processing for collation of voice information with the database section 115.

Collation of image information is performed with respect to still-image-based features such as faces, hairstyles, appearances from the back, figures, dresses and personal belongings, and moving-image-based features such as gestures and habits in the manner of walking. Personal recognition is made with respect to these features. For example, in the case of recognition of dress features, feature classes used at the time of collation are, for example, information on the spatial placement of local features (see Japanese Patent No. 3078166 filed by the applicant of the present invention) in terms of dress texture features, color component features and contours or images from a particular viewpoint of dress forms (classes "one-piece", "pants", "skirt", "shirt", "sweater" and "coat"). Still-image-based collation with respect to personal belongings and so on is also performed in a similar manner. As a method of detecting features in terms of gesture and habit in the manner of walking, any of well-known techniques (e.g., those described in Japanese Patent Laid-Open Nos. 2002-8042 and 2002-344946) may be used. Such techniques are not a main point of the present invention and will not be described.

After recognition of a person by the collation section 118, the secondary authentication section 119 performs recognition processing by using other feature amounts in order to complete further details of recognition processing with respect to the person.

Figure 6:
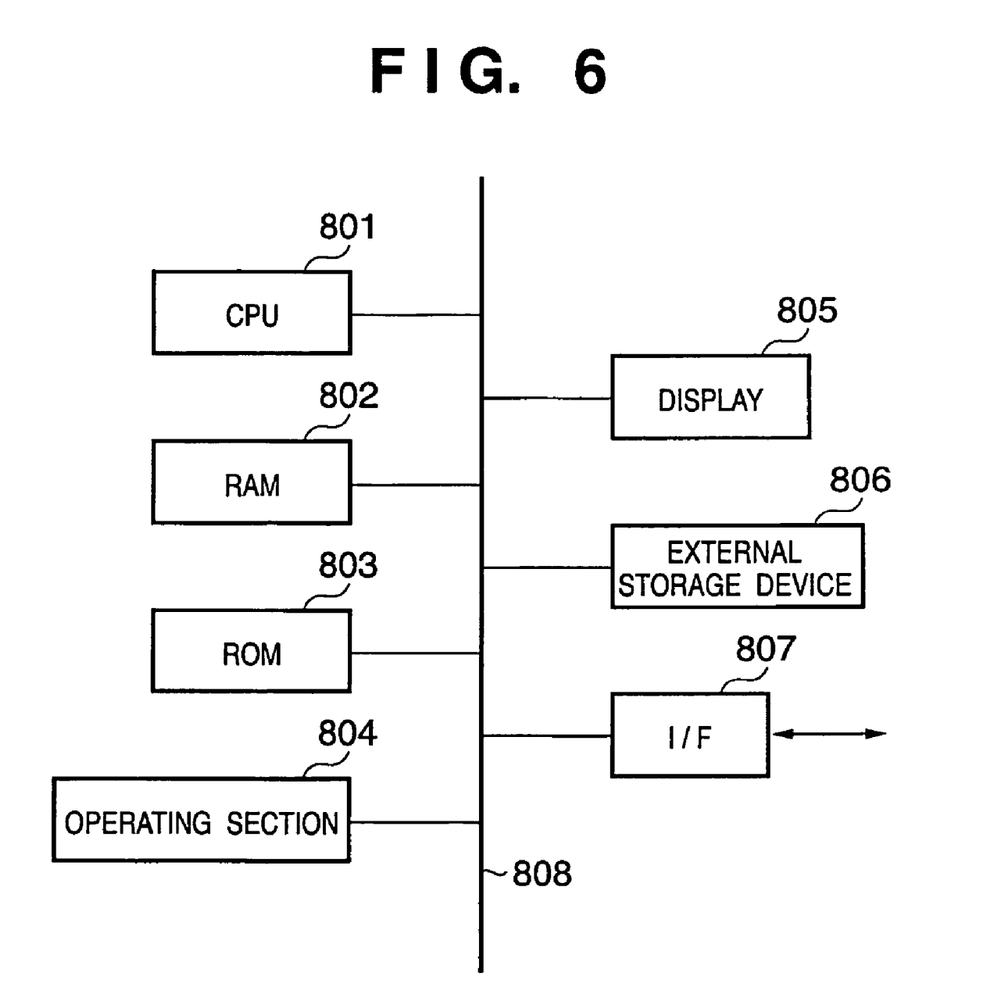
FIG. 6 is a block diagram showing a basic configuration of a recognition processor 1000.

FIG. 6 is a block diagram showing a basic configuration of the above-described recognition processor 1000. An ordinary personal computer (PC) or a workstation (WS) may be used as the recognition processor 1000. However, the recognition processor 1000 is not limited to the PC and WS.

In FIG. 6, reference numeral 801 denotes a central processing unit (CPU) which performs overall control of the processor by using a program and data stored in a random access memory (RAM) 802 and a read-only memory 803, and which executes each of processings of the recognition processor 1000 described below. Each of the person detection section 150, the feature information detection section 112, the learning classification section 113, the collation section 118 and the secondary authentication section 119, as shown in FIG. 2, operates as a functional part of the CPU 801.

The RAM 802 has an area for temporarily storing a program and data loaded from an external storage device 806 and a program and data received through an interface 807, and also has a work area used by the CPU 801 when executing each of various processings.

The ROM 803 stores set data and a boot program for the processor.

Reference numeral 804 denotes an operating section constituted by a keyboard and a mouse. An operator of the processor can input various instructions to the CPU 801 by operating the operating section 804.

Reference numeral 805 denotes a display constituted by a cathode ray tube or a liquid crystal display and capable of producing an image/character display of the results of processing performed by the CPU 801.

The external storage device 806 is constituted by a large-capacity information storage device such as a hard disk drive. An operating system (OS), a program and data for executing by means of the CPU 801 each of processings performed by the recognition processor 1000 as described below are stored in the external storage device 806. Information items stored in the database section 115 shown in FIG. 2, i.e., feature amounts stored on a class-by-class basis with respect to each individual, are also registered in the external storage device 806. Part or the whole of the information items is loaded to the RAM 802 under the control of the CPU 801 to be processed by the CPU 801.

The interface (I/F) 807 is used by this processor to perform data communication with an external device. For example, the above-mentioned video camera and microphone can be connected to the I/F 807. Also, the I/F 807 can be connected via a network to a device storing image information and voice information in an actual space.

Reference numeral 808 denotes a bus connecting the above-described sections.

Personal recognition processing according to this embodiment performed by the recognition processor 1000 having the above-described construction will be described with reference to FIG. 1, which is a flow chart of personal recognition processing. A program and data for enabling the CPU 801 to execute processing shown in the flowchart are stored in the external storage device 806. The program and data are loaded to the RAM 802 as required under the control of the CPU 801, and the CPU 801 performs the processing using the program and data. This processor thus performs each of processings described below.

Image information and voice information (referred to collectively as sensing data in some case) are input from the sensor section 111 to the recognition processor 1000. The CPU 801 detects this input and temporarily stores these sorts of information in the RAM 802 (step S1).

The CPU 801 next functions as the person detection section 150 to detect the head of a person or mainly a position corresponding to the face from the image stored in the RAM 802, and determine a person region in the image on the basis of the detected position (step S2).

The CPU 801 next functions as the feature information detection section 112 to detect a feature amount with respect to each of the predetermined classes from the person region determined in step S2 and to detect a feature amount with respect to each of the predetermined classes from the voice information obtained from the sensor section 111 (step S3). The CPU 801 obtains the valid value of each of the detected feature amounts (step S4) and selects some of the feature amounts to be used in subsequent processing on the basis of the obtained valid values (step S5).

In step S3, still-image-based feature amounts such as a face, a hairstyle, arms or hands, legs, a dress and a personal belonging, moving-image-based feature amounts such as a gesture and a manner of walking and voice information are detected. It is not necessary to completely extract these feature amounts. Extraction of some of them may be omitted depending on shielding with some other object or an illumination condition for example.

Processing in step S4 will next be described. An example of the method of obtaining the valid value of each feature amount in step S4 as mentioned above will be described below.

First, processing for obtaining output level Vi (normalized from 0 (minimum) to 1 (maximum)) from the module for detecting the feature amount in class i ($1 \leq i \leq N$) in the final layer in the hierarchical neural network shown in FIG. 7 is performed with respect to all the classes (all i values). In this embodiment, such a hierarchical neural network is not used with respect to voice information. However, if such processing is performed, a hierarchical neural network having classes determined in advance with respect to voice information is prepared and obtained voice information is input to the hierarchical neural network to obtain the output level in each class of the voice information. The same processing may also performed on other sorts of information (e.g., living body information).

The sum total S ($S=V_1+V_2+, \ldots V_N$) of the output levels in all the classes is thereafter obtained. The appearance frequency in each class is also obtained in advance. If the appearance frequency in class i is ki, the valid value Yi with respect to the feature amount in class i can be obtained by computing $$Yi = ki \times Vi/S$$

In this way, the relative validity (=valid value) can be obtained with respect to each class. However, a different method of obtaining the valid value with respect to each class may alternatively be used.

For example, in some case of typical local features in the above-described neural network obtained by a self-organization map, the similarity between the features in classes adjacent or close to each other is substantially high even when recognized with the human eyes. In such a case, typical classes having a low degree of similarity (such as those orthogonal to each other in a predetermined feature space) are selected. More specifically, a distance measure (such as Euclidian distance in a feature vector space) for evaluating the degree of similarity is introduced to select features remote from each other at least by a predetermined threshold value, or typical features is selected by human visual recognition. Feature classes thereby obtained include a plurality of local features with certain variations (e.g., size variations, orientation variations or illumination variations).

A selection from the feature amounts for use in subsequent processing may be made in the above-described way.

The above-mentioned processing in step S5 will be described. In this step, some of the feature amounts to be used in subsequent processing are selected on the basis of the valid values in the classes obtained in step S4. For example, the feature amounts having valid values equal to or larger than a predetermined threshold value are selected as feature amounts to be used in subsequent processing. The threshold value used for this selection may be adaptively set by examining statistics (e.g., a mean and a variance) of the valid values. In this embodiment, the mean of the distribution of the validity is used as the threshold value.

In ordinary cases of selection from the feature amounts using the valid values, for example, in a situation where a person is coming from a remote place, a face image is not suitable for discrimination of the person because the face size in the face image is excessively small. In such cases, the validity of features such as the manner of walking, the entire appearance, a hairstyle and a dress is increased while the validity of the face feature class is reduced, and it is possible to narrow down persons to be verified, by using some of the features including the manner of walking.

Needless to say, the validity of a feature obtained from a full face or the like when only an appearance from the back can be seen is low. Thus, no determination is made in advance as to in what order selection from the features and narrowing down of subjects are made. A selection from the features and a narrowing-down result are determined by evaluating the above-described validity determined according to conditions including environmental conditions, sensing information acquisition conditions and a situation in which persons to be recognized are placed.

Referring again to FIG. 1, the CPU 801 functions as the collation section 118 to perform processing for collation between the feature amounts selected in step S5 and the feature amounts registered in the database section 115 with respect to individuals in order to determine to whom the feature amounts selected in step S5 belong (step S6). The feature amounts selected in step S5 include an image feature and a voice feature. For collation of an image feature, image data is input in moving image form regardless of whether the feature class is still-image-based or moving-image-based. Plurality of image data items are input as time-series data to perform collation. If the proportion of the image data items determined as data for a particular person is equal to or higher than a predetermined value, the other determination results are treated as an error due to failure to suitably perform feature extraction. This is intended to reduce the occurrence of errors in recognition with variations in image taking conditions.

If as a result of this collation processing there is no match between the feature amounts registered in the database section 115 with respect to individuals and the feature amounts selected in step S5, the process advances to step S8 through step S7 and the CPU 801 functions as the secondary authentication section 119 to start secondary authentication processing (step S8). That is, it is not possible to strictly determine whether or not there is a match between the feature amounts registered in the database section 115 with respect to individuals and the feature amounts selected in step S5, because an error can occur in determination. Therefore authentication processing (secondary authentication processing) is further performed to make determination more strictly.

Secondary authentication includes iris recognition, authentication based on a gene arrangement, authentication based on living body information, e.g., fingerprint authentication, and authentication using text information indicating a password, the date of birth or any other attribute for personal identification. This text information is input by providing an input command or the like with respect to a person determined as an unregistered person.

If as a result of this secondary authentication processing a match occurs between the feature amounts registered in the database section 115 with respect to individuals and the feature amounts selected in step S5, the feature amounts selected in step S5 are registered in the database section 115 (step S9), and learning processing is performed so that the feature amounts selected in step S5 are recognized as the feature amounts for the corresponding individual (particular individual) (step S10). For this learning processing, a well-known technique (see, for example, Japanese Patent Laid-Open No. 5-89076 or 5-108596) may be used. At this time, outputs from sensors for measuring an illumination condition, humidity and temperature for example may be stored as environmental information in the database. A situation is conceivable in which a feature selected by the feature selection section 1122 can be determined to be inappropriate from consideration of the environmental information (for example, when the illuminance is so low that face image data is not useful in personal recognition). After the occurrence of such a situation, the environmental information enables feature selection to be suitably performed in personal recognition under a similar environmental condition. That is, the feature selection section 1122 may select some of the feature classes used for recognition by referring both to the validities of the feature classes and to the environmental information. Determination as to which kind of environmental information is to be stored depends on the feature class used in collation. For example, in a case where the feature class extracted from a face image is used, image taking conditions such as the illuminance and the amount of exposure are used as environmental information.

In this embodiment, as described above, high robustness against variations in illumination and environmental conditions and high collation accuracy can be maintained. Also, subjects of recognition can be narrowed down with efficiency.

In this embodiment, features relating to persons' actions, e.g., manners of walking, mannerisms, gestures, hawks and sneezes may be used as auxiliary information in personal recognition to narrow down subjects, thereby reducing the time required for authentication as well as improving the recognition accuracy.

In this embodiment, image information and voice information are collected as environmental information in an actual space and feature amounts to be used are determined in these sorts of information. However, information to be used as environmental information is not limited to these sorts of information. Only image information or voice information may be used and a suitable combination of the image/voice information and some other sort of information may be used.

While the sections shown in FIG. 2 have been described as the functions of CPU 801 in this embodiment, a piece of special-purpose hardware may constitute each section.

Second Embodiment

A second embodiment of the present invention will be described with respect to recognition of a person who is ordinarily in a living environment such as a home environment or a particular environment in an office for example or lives or works in such an environment during a predetermined time period, or recognition of the condition (normality/abnormality) of the person.

A detection section (an image taking device or the like) for detecting image-based features such as a feature in a face image, a detection section (a microphone or the like) for detecting voice-based features such as voice patterns and a detection section (sensor means) for detecting living body information described below by way of example are provided in an environment apart from each other. As living body information, at least one of an iris pattern, a fingerprint pattern, a vein pattern, gene arrangement information and smell is used. Each of these kinds of information is extracted by processing sensing data from corresponding sensors. Each of these kinds of information has conventionally been treated as living body sensing data for identifying individuals (see, for example, Japanese Patent Laid-Open No. 9-131335 for an individual identification technique based on smell). Personal condition recognition is performed by processing image data obtained mainly from an image taking device.

Personal recognition and personal condition recognition are performed by using sensing data obtained from the above-mentioned sensors as well as image information and voice information described above in the description of the first embodiment.

Figure 4:
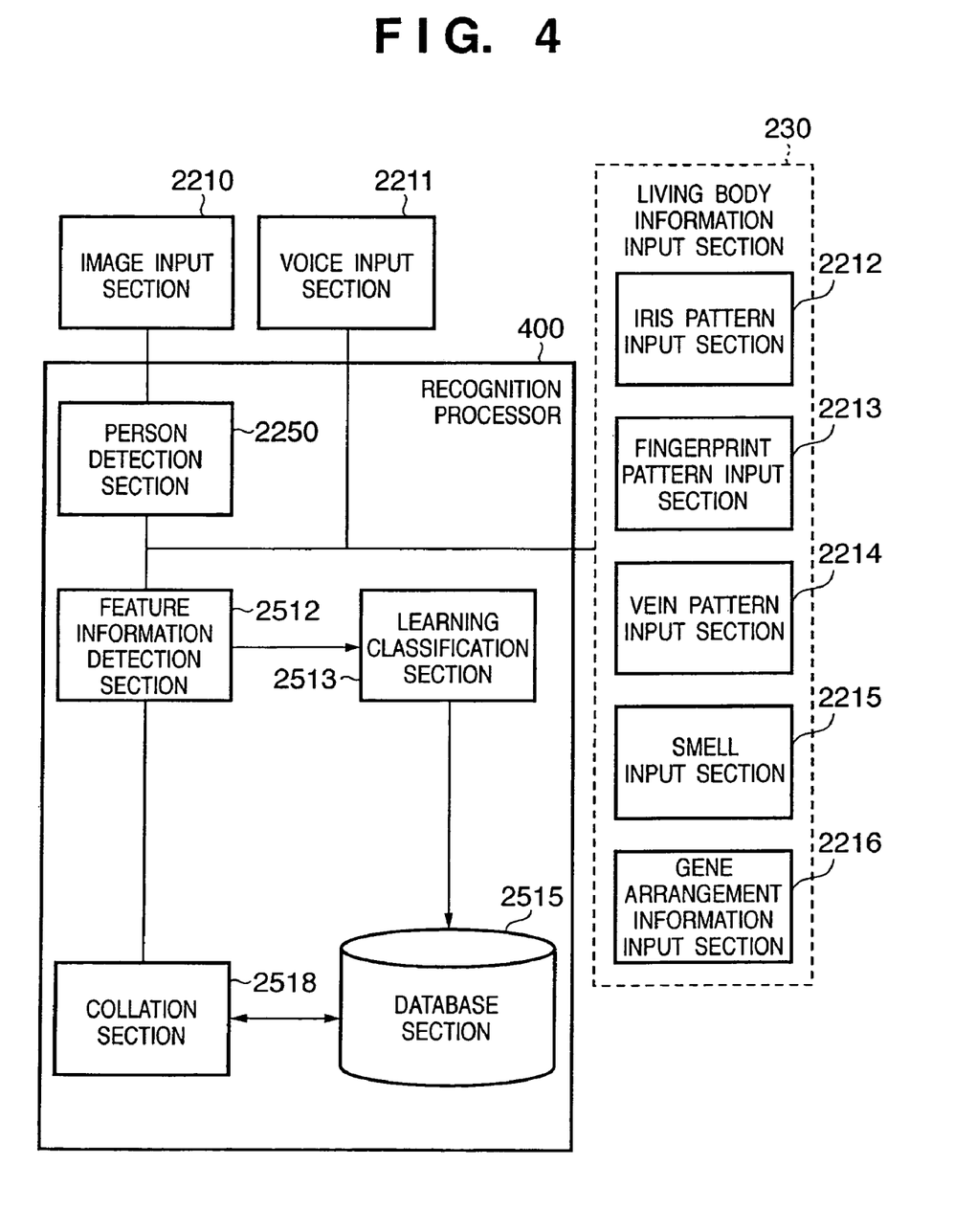
FIG. 4 is a block diagram showing a functional configuration of a personal recognition system according to a second embodiment of the present invention.

FIG. 4 is a block diagram showing the functional configuration of a personal recognition system according to this embodiment. As shown in FIG. 4, the system according to this embodiment is constituted by an image input section 2210, a voice input section 2211, a recognition processor 400 and a living body information input section 230. The recognition processor 400 is constituted by a person detection section 2250, a feature information detection section 2512, a learning classification section 2513, a database section 2515 and a collation section 2518.

The image input section 2210 and the voice input section 2211 are the same as the image sensing section 1111 for collecting image information and the voice sensing section 1112 for collecting voice information, respectively. The living body information input section 230 includes, as shown in FIG. 4, an iris pattern input section 2212, a fingerprint pattern input section 2213, a vein pattern input section 2214, a smell input section 2215 and a gene arrangement information input section 2216. The configuration of the living body information input section 230 is not limited to that constituted of all of these sections. The living body information input section 230 may be configured by using only one of these sections or a combination of some of these sections selected as required. A sensor for sensing living body information other than that mentioned above may be added to the living body information input section 230.

The configuration of the recognition processor 400 is identical to the basic configuration of the recognition processor 1000 except that the secondary authentication section 119 is removed. Each component of the recognition processor 400 performs basically the same processing as that performed by the corresponding components of the recognition processor 1000. Accordingly, the feature information detection section 2512 has the configuration shown in FIG. 3, as does the corresponding section in the first embodiment. The recognition processor 400 also has the same basic configuration as that in the first embodiment shown in FIG. 6.

Figure 5:
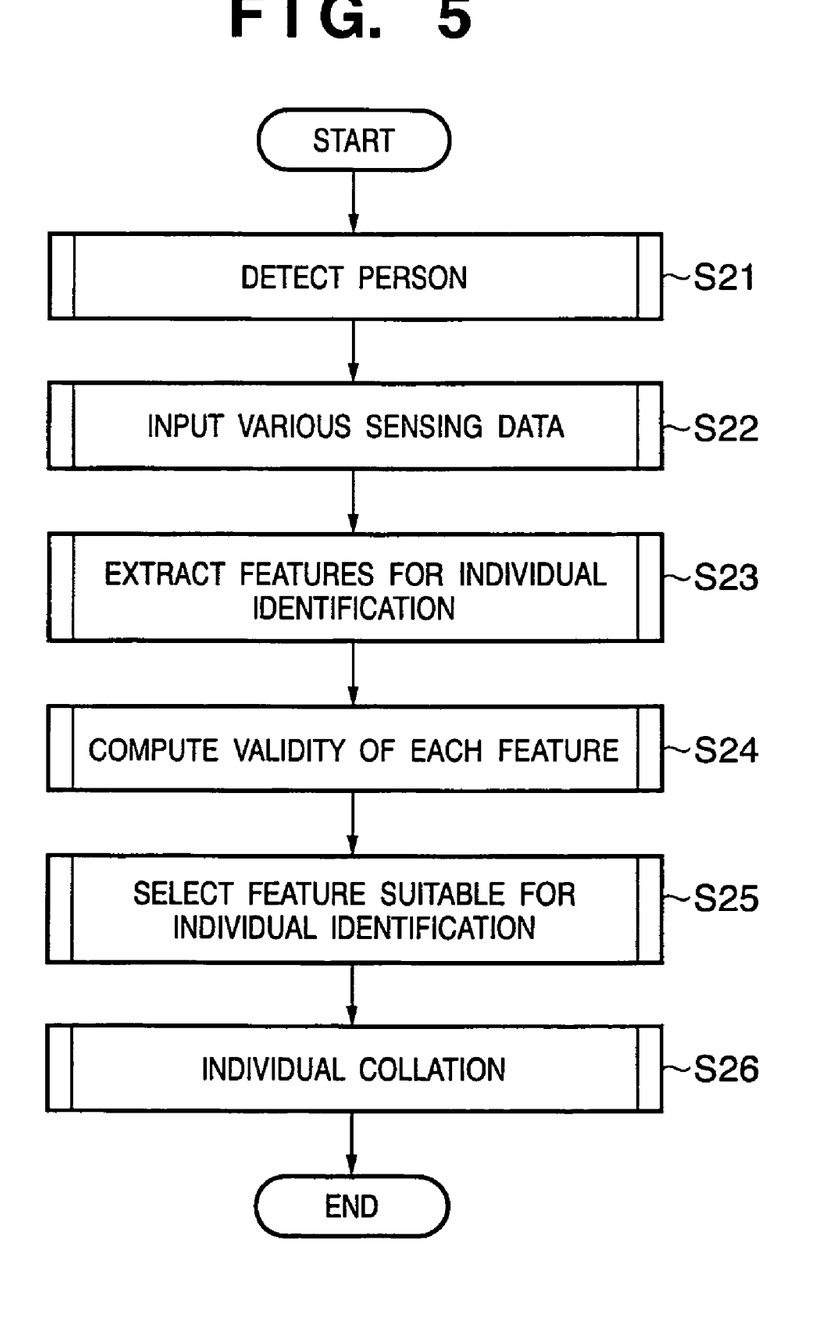
FIG. 5 is a flowchart of personal recognition processing according to the second embodiment of the present invention.

FIG. 5 is a flowchart of personal recognition processing performed by the recognition processor 400. The above-described processing in steps S1 and S2 is first performed to determine a person region in an image obtained from the image input section 2210 (step S21). Voice information is also obtained by the voice input section 2211, as in the first embodiment.

Living body information is obtained from a person existing in a space by the living body information input section 230 (step S22).

Processing in steps S23 to S26 is performed in the same manner as the above-described processing in steps S3 to S6. Processing in steps S23 to S26 differs from the corresponding processing in the first embodiment in that living body information is provided in addition to image information and voice information. In step S23, therefore, detection of a particular kind of pattern may be performed as described below.

In this embodiment, a person who is a subject of recognition is not required to perform a special operation. Making the person conscious of being recognized by the system is thus avoided. Also, the operating state of each sensor is concealed from the person who is an ordinary subject of recognition. A person is recognized by using only sensing data which can be obtained only in the environment around the person.

Therefore a validity evaluation section 2121 also has the function of monitoring whether or not a useful signal has been taken in from sensing data from each sensor. For example, the validity evaluation section 2121 includes an iris determination section for determining whether or not a pattern corresponding to the iris has been input from the iris pattern input section 2212, and detection sections with respect to outputs from the image input section 2210, including a face detection section, a back view detection section, a hair detection section and a dress detection section. The validity of the feature detection level from each section for individual identification is evaluated only when the detection level is equal to or higher than a threshold value. Each detection section may be set so as to be incorporated in the corresponding sensor section.

Each of the sensor for taking an image, the fingerprint sensor and the sensor for inputting an iris image is of a small type and embedded in a wall surface, a piece of furniture, an office machine, a desk, a mouse, a keyboard, a remote controller, etc. Each of the sensing sections including the vein pattern sensing section and the gene arrangement sensing section may be provided as a special-purpose sensing section according to its function.

For example, the gene arrangement sensing section analyzes a gene arrangement by using a sample picked by a device for automatically picking a bodily hair, a nail, a body fluid or the like of a person to be recognized. For example, a hair which has fallen from the person to be recognized is picked and a gene arrangement is analyzed. Verification as to whether or not the picked sample belongs to the person is performed by an image recognition section incorporated in the feature detection section 2120. For example, verification is performed by recognizing the moment at which the hair falls off from the person. The analysis system may be such that a gene arrangement information analysis section exists in a remote place and only a picking portion is provided in the environment around the person. The picking portion is, for example, in the form a small sweeping robot or a hand-eye-cooperation robot.

The vein pattern sensing section may have a construction (see Japanese Patent Laid-Open No. 2001-184507) in which a certain light receiving portion is provided in a mouse surface to receive a distribution of transmission light which corresponds to a vein pattern, and which is obtained from light emitted from a light source set a predetermined position. As the iris pattern sensing section, an image input portion such as an eye of an autonomous mobile robot is used.

The feature selection section 2122 selects features for individual identification on the basis of the validity evaluation value, as in the first embodiment.

Figure 1:
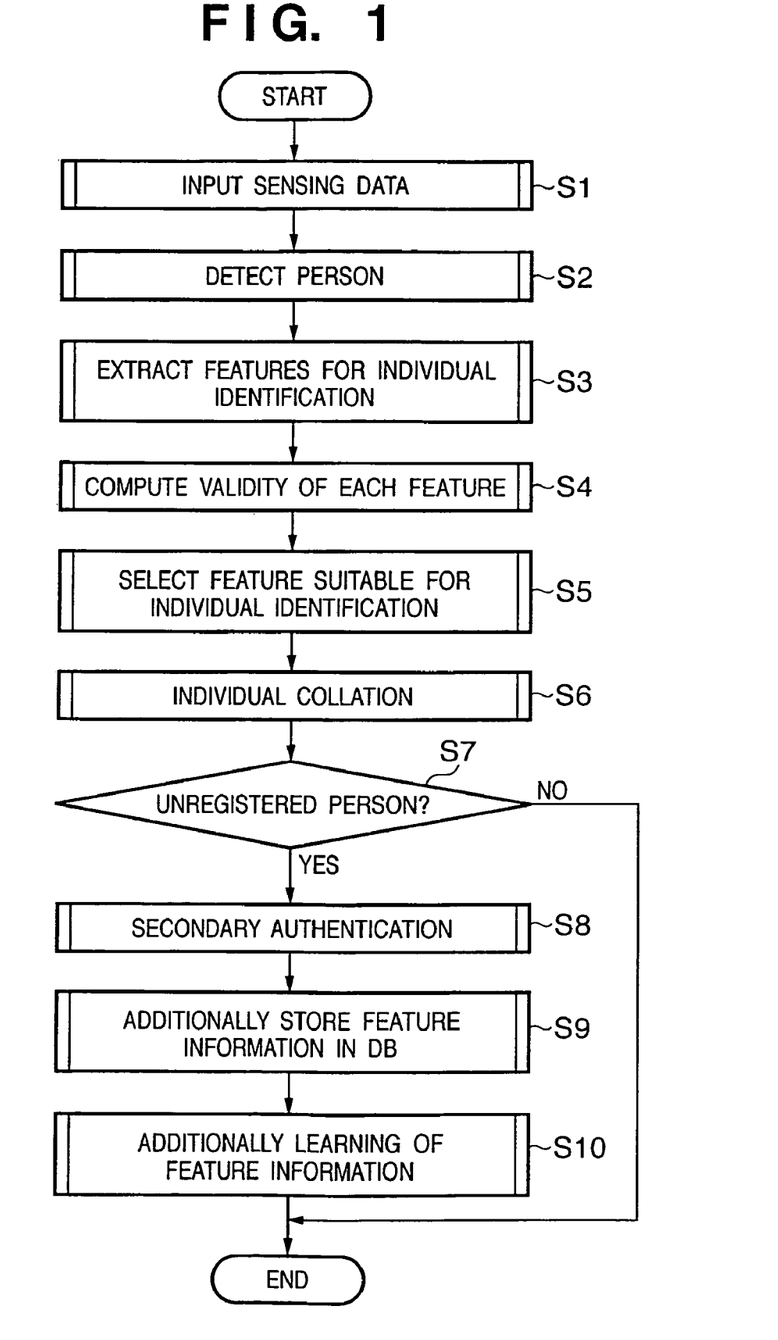
FIG. 1 is a flowchart of personal recognition processing according to a first embodiment of the present invention.
Figure 8:
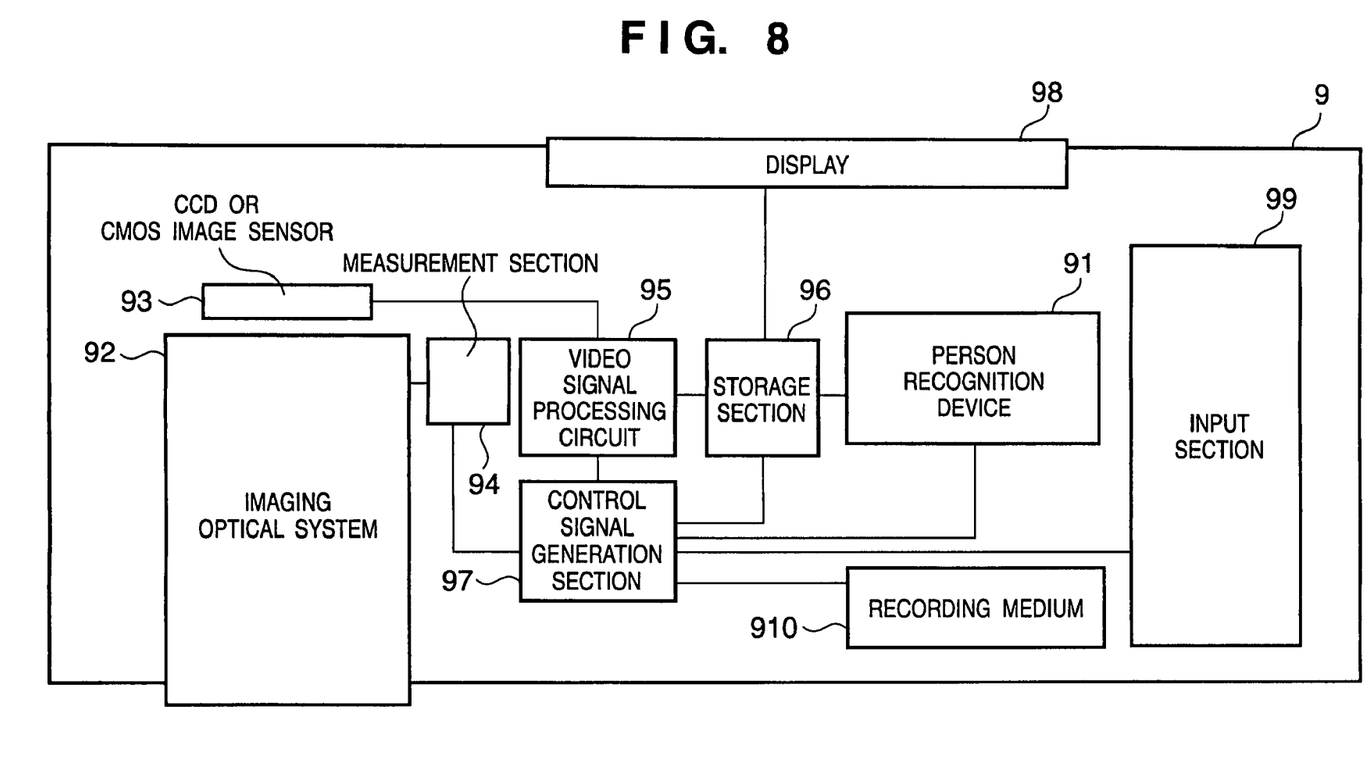
FIG. 8 is a diagram showing a basic configuration of a signal processor having the system shown in FIG. 1 or 5.

FIG. 8 is a diagram showing a basic configuration of a signal processor (e.g., a camera, a video camera, a scanner, a copying machine or a printer) having the system shown in FIG. 1 or 5.

As shown in FIG. 8, a processor main unit 9 is constituted by an imaging optical system 92 including an image taking lens and a drive control mechanism for zoom image taking, a CCD or a CMOS image sensor 93, an image taking parameter measurement section 94, a video signal processing circuit 95, a storage section 96, a control signal generation section 97 which generates control signals, for example, for control of the image input operation and control of image input conditions, a display 98, an input section 99 through which sensor information and user operation information are input, a recording medium 910, and a system (person recognition device) 91 corresponding to the system shown in FIG. 2 or 4.

This signal processor has the function of recognizing a particular user by the person recognition device 91 on the basis of sensor information from the input section 99 and giving permission for use only to the user and the function of limiting usable functions with respect to each of certain users. For example, recognition of a head portion such as a face, fingerprint verification, iris verification and voice verification are used in collation of persons registered in advance. The control signal generation section 97 generates a control signal for control of access to the processor (e.g., restriction of available functions on a user-by-user basis). In a case where a face or the like is to be recognized, an image of the object to be recognized may be input from the imaging optical system 92.

The operation of the person recognition device 91 may be the same as either of the operation in the first embodiment and the operation in the second embodiment. For example, if a person is determined as an unregistered person as a result of individual identification performed by evaluating the validity of various features and selecting a face-image-based feature in the processing flow shown in FIG. 1, the control signal generation section 97 may generate a display control signal for displaying an instruction to perform input of a password for the person through a ten-key cluster or the like in the input section 99, or a display control signal for displaying an instruction to perform fingerprint authentication on the display 98 to perform a secondary authentication processing. At this time, additional learning of a feature class for individual recognition is performed.

In the case where the person is determined as an unregistered person, a control signal to automatically stop functioning of the processor may be generated.

The system can also be used for various kinds of use, e.g., prevention of unauthorized use and room entry/exit control. In particular, the above-described control ensures reliable recognition of a person existing as a user and prevention of unauthorized use and theft.

Other Embodiment

Needless to say, the objects of the present invention can also be achieved by supplying a system or an apparatus with a recording medium (or storage medium) on which a program code of a piece of software for realizing the functions of the above-described embodiment is recorded, and by making a computer (or CPU or MPU) in the system or apparatus read out and execute the program code stored on the recording medium. In this case, the program code itself, read out from the recording medium, realizes the functions of the above-described embodiment, and the recording medium on which the program code is recorded constitutes the present invention.

Also, needless to say, the present invention includes not only a case where the functions of the above-described embodiment are realized by the computer executing the program code read out, but also a case where an operating system (OS) running on the computer performs part or the whole of actual processing on the basis of instructions of the program code, and where the functions of the above-described embodiment are realized by the processing.

Further, needless to say, the present invention includes a case where the program code read out from the recording medium is written to a function expansion card inserted in the computer or to a memory provided in a function expansion unit connected to the computer, where a CPU or the like provided in the function expansion card or the function expansion unit performs part or the whole of actual processing, on the basis of the instruction of the program code, and where the functions of the above-described embodiment are realized by the processing.

In a case where the present invention is applied to the above-described recording medium, a program code corresponding to the flowchart described above is stored on the recording medium.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-112663, filed Apr. 8, 2005, which is hereby incorporated by reference herein in its entirety.

What is claimed is:

1. An information processing apparatus, the apparatus comprising:
   a plurality of sensing means for sensing a plurality of types of data from a space in which a person exists;
   detection means for detecting a plurality of kinds of feature amounts from the plurality of types of data sensed by said plurality of sensing means;
   calculation means for calculating respective valid values of the plurality of kinds of feature amounts detected by said detection means;
   selection means for selecting at least one feature which has a relatively high valid value from among the plurality of kinds of feature amounts, on the basis of the respective valid values calculated by said calculation means; and
   identification means for identifying the person by using at least the selected one feature amount with the relatively high valid value,
   wherein said calculation means includes:
   means for performing processing for obtaining normalized output level Vi of modules for detecting the feature amounts with respect to all classes i in a final layer of a hierarchical neural network;
   means for calculating a sum total $S=V_1+V_2+,\ldots V_N$ of output levels in all the classes; and
   means for calculating a valid value Yi of the feature amount in class i by computing $Yi=ki \times Vi/S$ where ki represents the appearance frequency in class i.

2. The information processing apparatus according to claim 1, wherein each of said plurality of sensing means senses one or more of image information of the space, voice information in the space and living body information on the person existing in the space.

3. The information processing apparatus according to claim 2, wherein each of said plurality of sensing means senses image information of the space and said detection means detects an image feature amount relating to an appearance of the person or an action of the person.

4. The information processing apparatus according to claim 2, wherein each of said plurality of sensing means senses voice information in the space and said detection means detects a voice feature amount relating to a nonlinguistic voice.

5. The information processing apparatus according to claim 2, wherein each of said plurality of sensing means senses at least one of an iris pattern, a fingerprint pattern, a vein pattern, gene arrangement information and smell as living body information on the person existing in the space.

6. The information processing apparatus according to claim 1, wherein said selection means selects at least one feature amount having a valid value equal to or higher than a predetermined threshold value as the feature amount to be used for personal recognition.

7. The information processing apparatus according to claim 1, wherein said selection means select, with a predetermined probabilistic weight, a predetermined number of feature amounts from the plurality of kinds of feature amounts detected by said detection means.

8. The information processing apparatus according to claim 7, wherein the probabilistic weight is determined on the basis of a distribution of the feature amounts detected by said detection means.

9. The information processing apparatus according to claim 1, further comprising hold means for holding groups of feature amounts with respect to individuals,
   wherein said identification means includes collation means for performing collation between the at least one feature amount selected by said selection means and the groups of feature amounts held by said hold means to determine to whom the feature amount belongs.

10. The information processing apparatus according to claim 9, further comprising registration means for registering the at least one feature amount selected by said selection means in said hold means if the at least one feature amount selected by said selection means does not coincide with any of the personal feature amount groups held by said hold means.

11. The information processing apparatus according to claim 9, wherein if the feature amount selected by said selection means does not coincide with any of the personal feature amount groups held by said hold means, said identification means identifies the person based on some of the feature amounts different from the selected feature amount.

12. An information processing method, the method comprising:
performing by a processor the following steps:
a plurality of sensing steps of sensing a plurality of types of data from a space in which a person exists;
a detection step of detecting a plurality of kinds of feature amounts from the plurality of types of data sensed in the plurality of sensing steps;
a calculation step of calculating respective valid values of the plurality of kinds of feature amounts detected in the detection step;
a selection step of selecting at least one feature amount which has a relatively high valid value from among the plurality of kinds of feature amounts, on the basis of the respective valid values calculated in the calculation step; and
an identification step of identifying the person by using at least the selected one feature amount with the relatively high valid value,
wherein said calculation step includes:
obtaining normalized output level Vi of modules for detecting the feature amounts with respect to all classes i in a final layer of a hierarchical neural network;
calculating a sum total $S=V_1+V_2+,\ldots V_N$ of output levels in all the classes; and
calculating a valid value Yi of the feature amount in class i by computing $Yi=ki \times Vi/S$ where ki represents the appearance frequency in class i.

13. A non-transitory computer-readable storage medium storing a computer-executable program for making a computer execute the information processing method according to claim 12.

* * * * *